(12) United States Patent
Ross (10) Patent No.: US 6,471,576 B1
(45) Date of Patent: Oct. 29, 2002

(54) ANIMAL STUNNING SYSTEM

(76) Inventor: Matthew H. Ross, 258 Donaton Rd., Greenville, PA (US) 16125

( * ) Notice: Subject to any disclaimer, the term of this patent is extended or adjusted under 35 U.S.C. 154(b) by 0 days.

(21) Appl. No.: 09/854,550

(22) Filed: May 15, 2001

(51) Int. Cl.[7] ................................................. A22B 3/06
(52) U.S. Cl. .......................................... 452/58; 452/59
(58) Field of Search .............................. 452/58, 59, 65, 452/60

(56) References Cited

U.S. PATENT DOCUMENTS

| | | | |
|---|---|---|---|
| 2,536,220 A | 1/1951 | Rabin ............................ 17/11 |
| 3,012,271 A | 12/1961 | Morse ............................ 17/45 |
| 3,152,357 A | 10/1964 | Wemmer ......................... 17/1 |
| 4,524,487 A | 6/1985 | Goossens ...................... 17/1 E |
| 4,953,263 A | 9/1990 | Lambooy ...................... 17/1 E |
| 5,327,854 A | * 7/1994 | Smith et al. ................. 119/220 |
| 5,401,209 A | 3/1995 | Ripol ........................... 452/58 |
| 5,433,658 A | 7/1995 | Kettlewell et al. ............ 452/59 |
| 5,486,145 A | 1/1996 | Dorsthorst et al. ........... 452/58 |
| 5,487,698 A | 1/1996 | Kettlewell et al. ............ 452/58 |
| 5,704,830 A | 1/1998 | Van Ochten .................. 452/58 |
| 5,906,540 A | 5/1999 | Grandin ........................ 452/58 |
| 5,954,572 A | 9/1999 | Kettlewell .................... 452/58 |
| 6,338,673 B2 | * 1/2002 | Berry et al. .................. 452/58 |
| 6,369,465 B1 | * 4/2002 | Swanson ................ 307/112 IJ |

* cited by examiner

*Primary Examiner*—Peter M. Poon
*Assistant Examiner*—Joan M. Olszewski
(74) *Attorney, Agent, or Firm*—Welsh & Flaxman LLC (57) ABSTRACT

A control system for applying an electrical charge in stunning an animal. The system includes an electrical charge control section directly controlling electrical charge transmitted to stun paddles for stunning an animal and a microprocessor controller linked to the electrical charge control section. The microprocessor controller generates instructions for controlling the waveform applied by the electrical charge control section by permitting adjustment of the stun current, stun frequency and stun time. The system further includes a user interface through which an operator may control the microprocessor controller and the electrical charge control section.

22 Claims, 6 Drawing Sheets

ANIMAL STUNNING SYSTEM

BACKGROUND OF THE INVENTION

1. Field of the Invention

The invention relates to a stunning apparatus. More particularly, the invention relates to a stunning apparatus providing a high frequency, constant current waveform for application to an animal being slaughtered.

2. Description of the Prior Art

Various regulations have been developed to ensure that animals are slaughtered in a humane manner. These regulations generally govern the current and duration of electric charge applications to ensure that animals are slaughtered in a desirable manner. A variety of electrical stunning apparatuses have, therefore, been developed and employed for stunning these animals before they are slaughtered. In addition to ensuring that slaughter proceeds in a humane manner, proper electrical stunning of animals improves the quality of meat, therefore, increasing the value of the meat obtained from the animals. Electrical stunning apparatuses may also be employed to complete the slaughter process.

With the foregoing in mind, the controlled application of an electrical charge which stuns an animal without damaging the meat obtained therefrom is desired. Prior art devices have attempted to provide such a stunning apparatus, but have consistently fallen short. As such, a need currently exists for a stunning apparatus which applies an electrical charge which stuns an animal without damaging the meat obtained therefrom. The present invention provides such a stunning apparatus.

SUMMARY OF THE INVENTION

It is, therefore, an object of the present invention to provide a control system for applying an electrical charge in stunning an animal. The system includes an electrical charge control section directly controlling electrical charge transmitted to stun paddles for stunning an animal and a microprocessor controller linked to the electrical charge control section. The microprocessor controller generates instructions for controlling the waveform applied by the electrical charge control section by permitting adjustment of the stun current, stun frequency and stun time. The system further includes a user interface through which an operator may control the microprocessor controller and the electrical charge control section.

It is also an object of the present invention to provide a control system for applying an electrical charge in stunning an animal wherein the microprocessor controller and electrical charge control section provide a high stun frequency with a constant peak current.

It is an other object of the present invention to provide a control system for applying an electrical charge in stunning an animal wherein the stun frequency is adjustable between approximately 50 and 1000 Hz.

It is a further object of the present invention to provide a control system for applying an electrical charge in stunning an animal wherein the stun frequency is approximately 400 Hz.

It is also another object of the present invention to provide a control system for applying an electrical charge in stunning an animal wherein the stun current is adjustable between approximately 0.75 and 3.00 A.

It is still another object of the present invention to provide a control system for applying an electrical charge in stunning an animal wherein the stun current is approximately 1.25 A.

It is yet a further object of the present invention to provide a control system for applying an electrical charge in stunning an animal wherein the stun time is adjustable between approximately 0.5 and 10.0 seconds.

It is also a further object of the present invention to provide a control system for applying an electrical charge in stunning an animal wherein the stun time is approximately 1.0 second.

It is another object of the present invention to provide a control system for applying an electrical charge in stunning an animal wherein the stun frequency is adjustable between approximately 50 and 1000 Hz.

It is a further object of the present invention to provide a control system for applying an electrical charge in stunning an animal wherein the stun frequency is approximately 400 Hz.

It is also an object of the present invention to provide a control system for applying an electrical charge in stunning an animal wherein the microprocessor controller further provides for adjustment of stun lifted prod detection.

It is still another object of the present invention to provide a control system for applying an electrical charge in stunning an animal wherein the microprocessor controller further provides for adjustment of early stun delay.

It is a further object of the present invention to provide a control system for applying an electrical charge in stunning an animal wherein the microprocessor controller further provides for adjustment of a no stun bus voltage.

It is also an object of the present invention to provide a control system for applying an electrical charge in stunning an animal wherein the microprocessor controller further provides for adjustment of a no load detection level.

It is another object of the present invention to provide a control system for applying an electrical charge in stunning an animal wherein the microprocessor controller further provides for adjustment of a stun command input.

It is a further object of the present invention to provide a control system for applying an electrical charge in stunning an animal wherein the microprocessor controller further provides for adjustment of a stunner reference address.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

The detailed embodiment of the present invention is disclosed herein. It should be understood, however, that the disclosed embodiment is merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
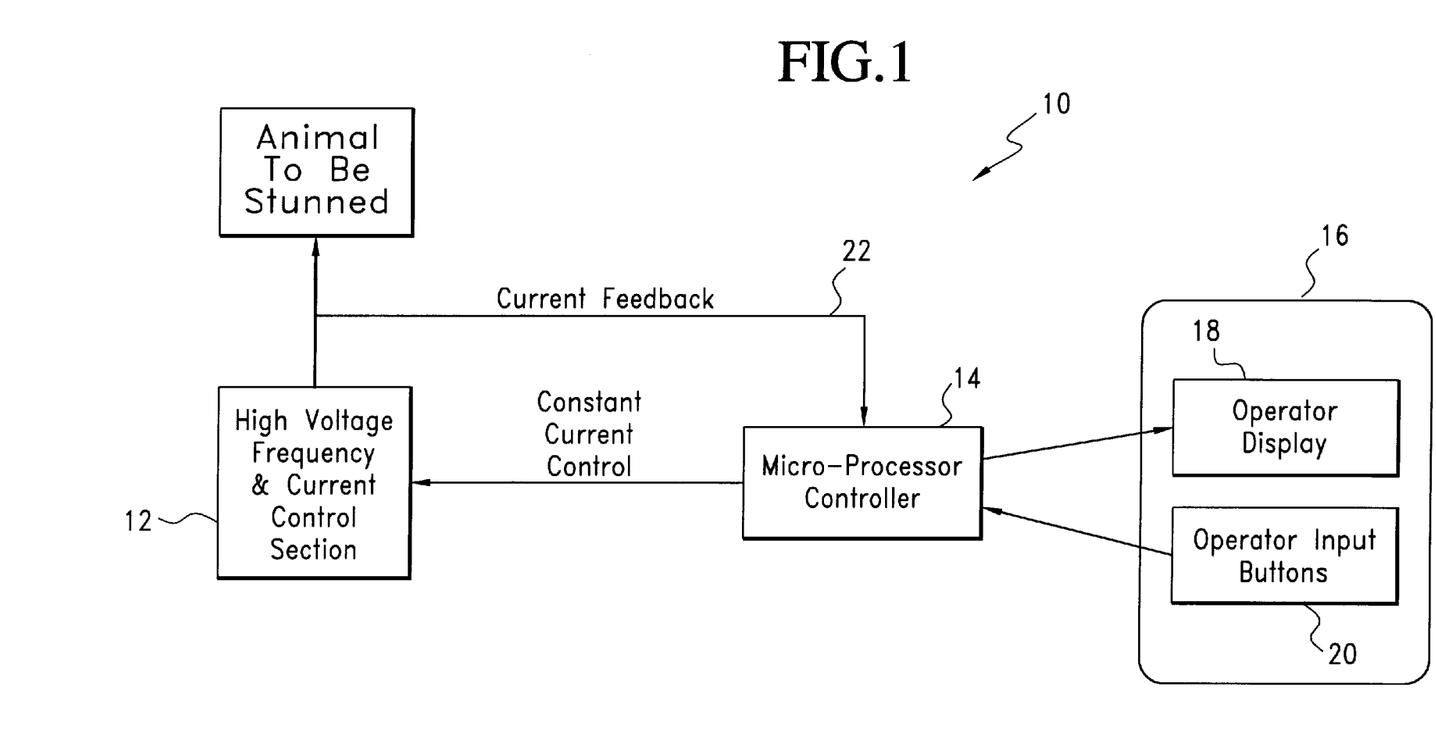
FIG. 1 is a schematic of the present stun control system in accordance with the present invention.

With reference to FIG. 1, a schematic of the present stunning system 10 is disclosed. The stunning system 10 provides for controlled application of an electrical charge to an animal being slaughtered. The system 10 permits the controlled application of an electrical waveform to an animal being slaughtered, wherein the waveform may be varied to provide desired voltage, current, frequency and time.

For example, the system 10 allows for one to shape the current waveform for optimal stun quality, select a profile optimized for a particular operation, and vary the stun frequency to the animal over a range from 50 Hz to 2000 Hz. The system 10 also provides the operator with a visual or audible feedback signal as to the quality of the last stun cycle to help teach and prevent improper stuns due to operator error. The system 10 finally provides the ability to form two or more discrete current/voltage profiles during one stun cycle utilizing one set of stun prods.

In general, the system includes a high voltage, frequency and current control section 12 linked to microprocessor controller 14. An operator is provided access to the high voltage, frequency and current control section 12 and microprocessor controller 14 via a user interface 16 including an operator display 18 and operator input 20. Current feedback 22 relating to each of the slaughtered animals and the applied charge is fed to the microprocessor controller 14 for subsequent use in modifying applied charges and warning the operator of malfunctions.

Figure 2:
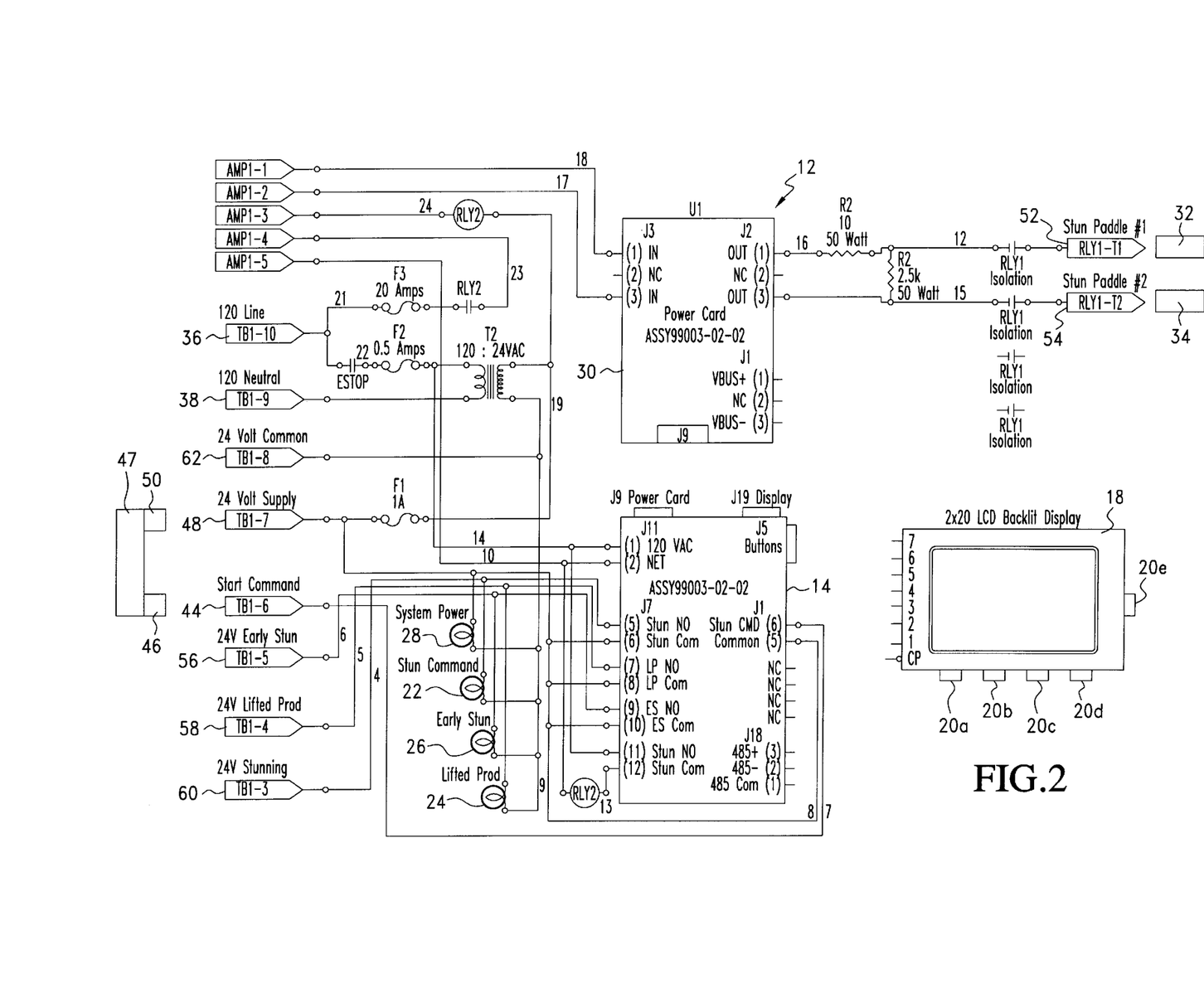
FIG. 2 is a circuit diagram of the present stun system.
Figure 6:
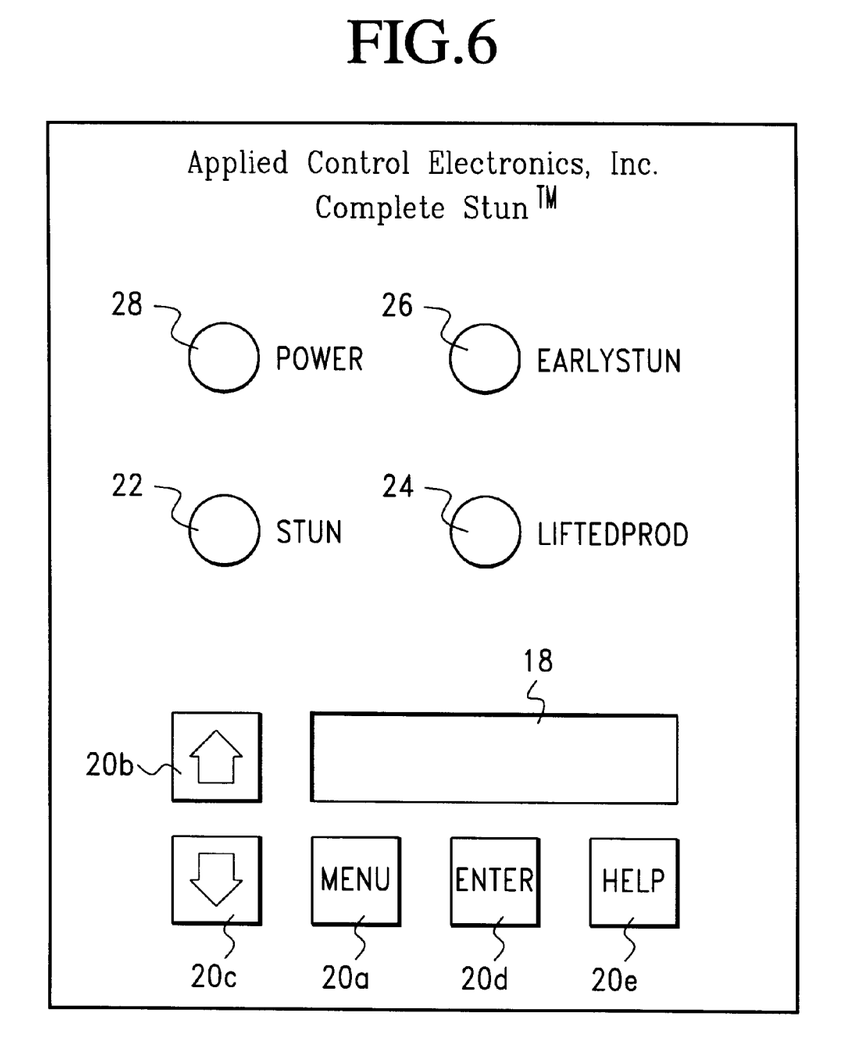
FIG. 6 is a front view of the user interface presented in the schematic of FIG. 1.

Referring to the circuit diagram shown in FIG. 2 and the user interface 16 shown in FIG. 6, operation of the microprocessor controller 14 is facilitated via a user interface 16 generally including control buttons 20a, 20b, 20c, 20d, 20e integrated with the display 18. For example, the user interface 16 includes a menu key 20a, up key 20b, down key 20c, enter key 20d and help key 20e. This series of keys permits an operator to work through a series of menus in controlling the present system 10. In accordance with a preferred embodiment of the present invention, the display 18 is a LCD backlit display coupled to the microprocessor controller 12. This allows the operator to conveniently monitor operation of the present system 10. While a specific display and interface keys are disclosed above in accordance with a preferred embodiment of the present invention, those skilled in the art will appreciate the many possible variations in the display and keys which may be undertaken without departing from the spirit of the present invention.

The operator is warned of proper system operation by a series of warning lights linked to power supplies and integrated with the user interface 16. For example, and in accordance with a preferred embodiment of the present invention, the microprocessor controller 14 is linked to a stun warning lamp 22, a lifted prod warning lamp 24, an early stun warning lamp 26 and a system power warning lamp 28. These warning lamps respectively provide the operator with a visible warning regarding the proper, or improper, operation of the present system 10. While four warning lamps have been chosen for use in accordance with a preferred embodiment of the present invention, it is contemplated that fewer or additional warning lights may be utilized in accordance with the present invention.

The high voltage, frequency and current control section 12 includes a power card 30 linked to the microprocessor controller 14. The power card 30 receives instructions from the microprocessor controller 14 relating to the electrical charge to be applied to the animal via the first and second stun paddles 32, 34. Generally, the applied electrical charge is controlled by the operator interacting with the display 18 and input keys 20a, 20b, 20c, 20d, 20e to pull-up, modify and enter a variety of available operating menus.

Figure 3:
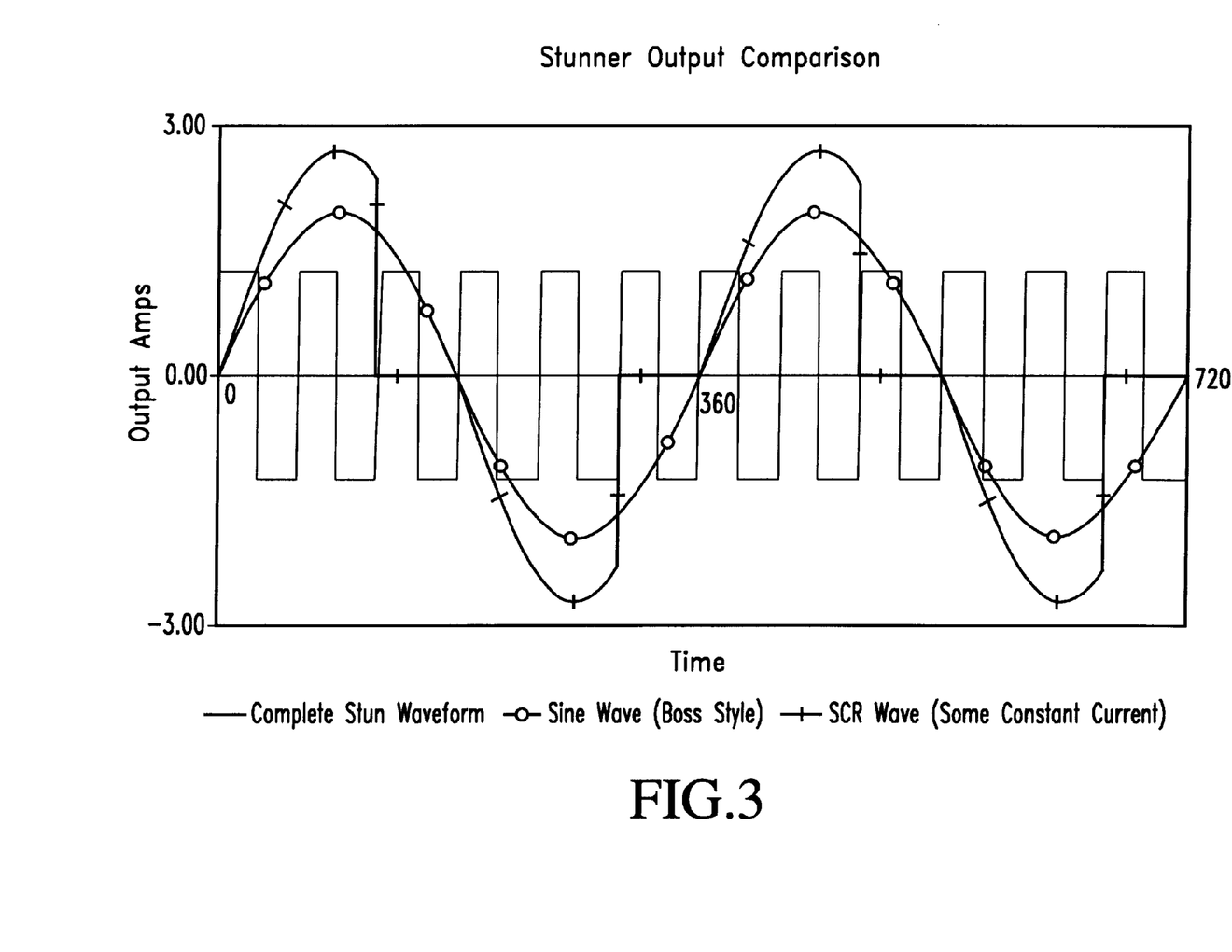
FIG. 3 is a stunner output comparison presenting a waveform generated in accordance with the present system with waveforms generated in prior art devices.
Figure 4:
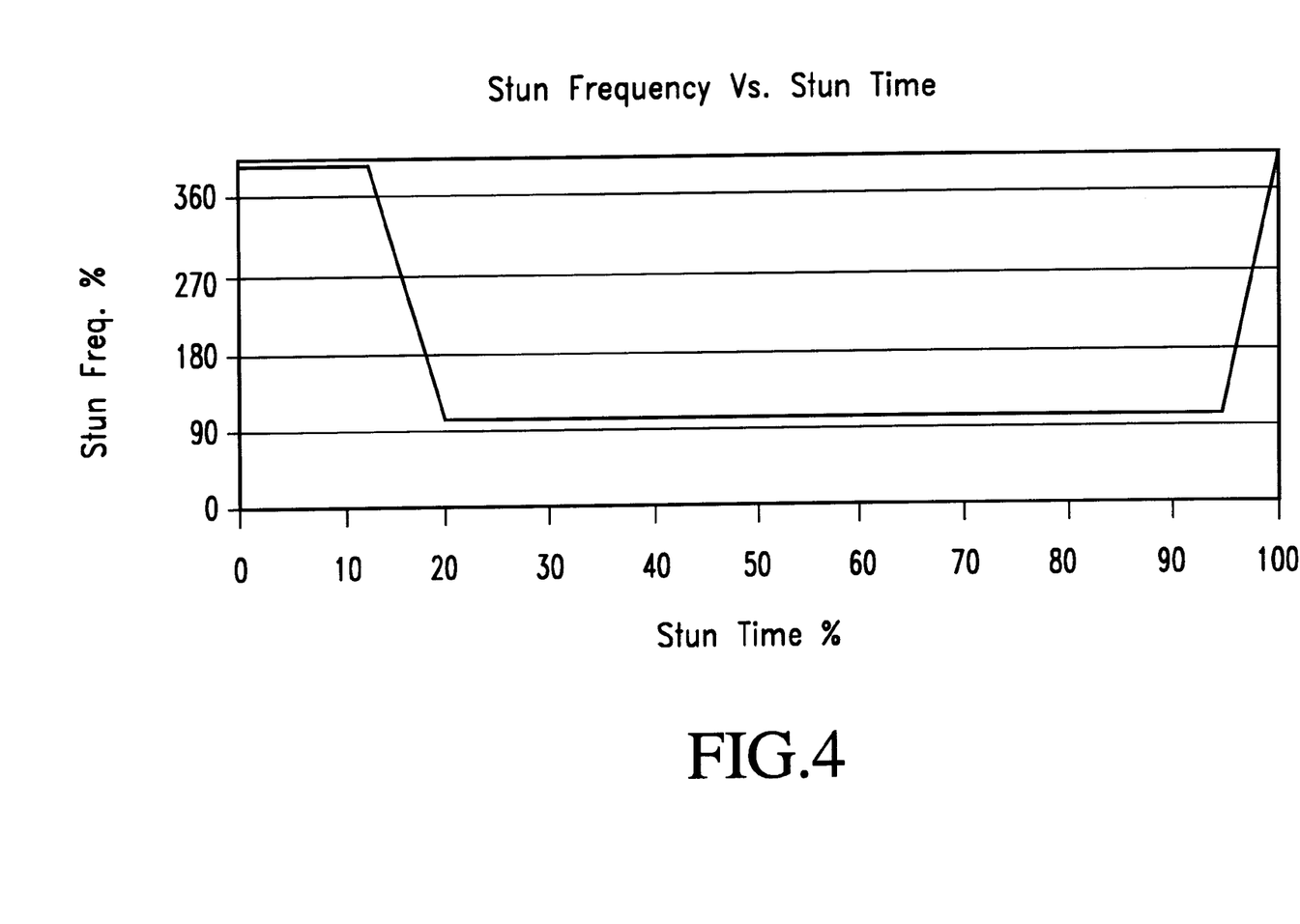
FIG. 4 is a graph showing the stun frequency applied in accordance with the present invention as a function of time.
Figure 5:
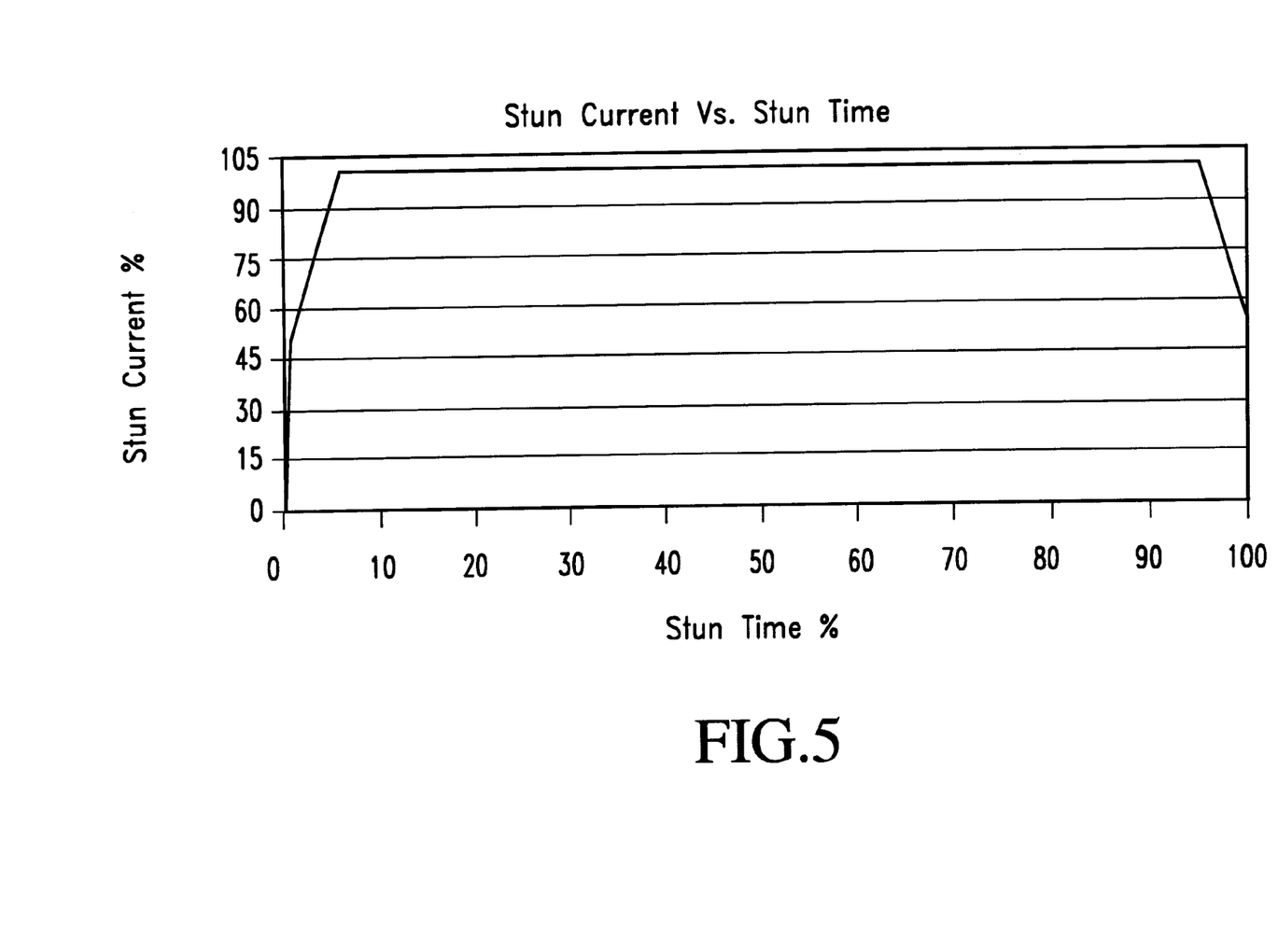
FIG. 5 is a graph showing the stun current applied in accordance with the present invention as a function of time.

In accordance with a preferred embodiment of the present invention, the microprocessor controller 14 and high voltage, frequency and current control section 12 work in conjunction to provide a highly controlled waveform to the animal being stunned. Specifically, and with reference to FIG. 3, 4 and 5, the microprocessor controller 14 defines an electrical waveform maintaining a true constant current level while varying the stun frequency. By applying the microprocessor controller 14 in accordance with the present invention, an operator is able to apply a charge with virtually any waveform to the animal being stunned. The present system 10 provides a higher stun frequency with a constant peak current (see FIG. 3—Complete Stun Waveform) to overcome the limitations of prior art systems which are only capable of providing a stunner output with a high peak current and low stun frequency (see FIG. 3—Sine Wave & SCR Wave). The present system further provides an operator with the ability to control the applied frequency to optimize the stunning operation.

In operation, and with reference to FIG. 2, the present system 10 is installed by connecting line 36 to an incoming 120 VAC line power, line 38 to an incoming 120 VAC line neutral and the ground line (not shown) to a true earth ground. Thereafter, a conventional 4-pole 600 VAC stun prod jack is connected in the following manner: the start command connector 44 is coupled to the high side 46 of the stunner wand switch 47, the voltage supply 48 is coupled to the low side 50 of the stunner wand switch 47, relay 52 is coupled to the first stunner prod 32 and relay 54 is coupled to the second stunner prod 34. As mentioned above, the system 10 is provided with warning lamps, these lamps are coupled through connectors 56, 58 and 60 to the 24 VAC common 62.

With reference to FIG. 6, a preferred embodiment of the user interface 16 is disclosed. As mentioned above, the interface 16 is provided with a display 18 and operator input keys 20a, 20b, 20c, 20d, 20e. The user interface 16 is further provided with the warning lamps discussed above, that is, the stun warning lamp 22, lifted prod warning lamp 24, early stun warning lamp 26 and system power warning lamp 28.

Once the system 10 is properly installed, the start up procedure may be initiated via the user interface 16. Under normal operating conditions, and with reference to the user interface 16 shown in FIG. 6, the status lights will indicate the following conditions: system power warning lamp (28)= on; stun warning lamp (22)=off; lifted prod warning lamp (24)=off; early stun warning lamp (26)=off. The top line of the display 18 will show "Stun Current=.0X A". The bottom line of the LCD display 18 scrolls between 4 metered values. Specifically, the bottom line of the display 18 may be scrolled through the following metered values:

"Bus Voltage=XXX V" (=/−5% of programmed No Stun Bus Voltage)

"Error Flags="

"Line Voltage=XXX V" (Should be +/−15% of control voltage*4)

"Peak Current=XXX A" (Will Display the Last Stun Peak Current)

If all values and lights are operating normally, the operator connects the stun prods 32, 34 and performs several dry stuns. When the stun command on the stunner wand switch 47 is pressed under these conditions, the stun warning lamp 22 should turn off followed by the early stun warning lamp 26 and then the lifted prod warning lamp 24. The dry stuns should be repeated at least ten times to verify that the system warning lamps cycle properly each time.

Assuming everything has functioned properly during the start up procedure, the operator is next ready to set the stun profile. The stun profile is established via various menus available through the user interface 16. The settings generally requiring optimization are stun time, stun current and stun frequency. The stun time, stun current and stun frequency are accessed by pressing the menu or enter keys until the parameter the operator wishes to change is displayed. When the parameter is displayed, the operator may use the up and down arrow keys to adjust the set point. Once the operator has completed adjusting the parameter, the menu or enter keys may be used to return to the meter displays.

Stun current selects the controlled current to the animal being stunned. A higher current will generally reduce the involuntary kicking and allow for a shorter stun time.

However, increased stun current will increase the likelihood of bone fractures and blood splash. For the stunning of hogs the stun current is typically from 1.35 to 1.65 A (stun current should never be set below 1.25 A to insure a true stun). For sheep, the stun current will typically be set from 1.00 to 1.45 A (the stun current should never be set below 1.00 A to insure a true stun).

The stun time selects the length of time each stun will last. The longer the stun time, the less involuntary kicking that will be encountered. When the stun time is increased, the stun frequency may usually be set higher and/or the stun current can be set lower. The typical stun time is 1.5 to 5 seconds.

The stun frequency controls the frequency of the stun current wave form. A higher frequency will shorten the muscle contraction time and help to reduce bone fractures and blood splash. A higher frequency will also increase the involuntary kicking of the stunned animal. In accordance with the present system, typical frequencies are from approximately 60 to 500 Hz.

For example, in a system where a site is stunning 500 hogs an hour with the default settings (see below), but is still finding bone fractures, the stun frequency may be increased to 450 Hz. This will result in a higher than acceptable level of involuntary kicking and should be combined with a stun time of 3.5 seconds. If this yields ideal results, the optimization is complete and the site may proceed with normal operation.

In all, the present system has fourteen programmable set points, although only the stun current and stun time set points generally require adjustment. As with the parameters discussed above, the set points may be accessed by pressing the menu or enter keys until the set point one wishes to change is displayed. When the set point the operator wishes to change is displayed, the operator may use the up and down arrow keys to adjust the set point. Once the operator has completed adjusting the set point, the menu or enter keys may be used to return to the meter displays. The following list summarizes the various possible set points.

Setpoint #1 Stun Current Setting (discussed above)

Adjustable from 0.75 to 3.00 A, factory default of 1.25 A. This setpoint controls the current delivered to the stunner prods. This setpoint should be kept at or above 1.25 A. Increasing this setpoint will reduce involuntary kicking but also increase the likelihood of meat damage.

Setpoint #2 Stun Time Setting (discussed above)

Adjustable from 0.5 to 10.0 seconds, factory default of 1.0 seconds. This setpoint controls the length of time current is delivered to the stun prods. Longer stun times will help to keep involuntary kicking to a minimum.

Setpoint #3 Stun Frequency Control (discussed above)

Adjustable from 50 to 1000 Hz, factory default of 400 Hz. This setpoint controls the period of each current cycle. Increasing the frequency will reduce broken backs and blood splash but can increase involuntary kicking if the stun time is too short (<2.0 seconds). Consult factory before adjusting this parameter.

Setpoint #4 Step #2 Current Setting

Adjustable from 0.75 to 3.00 Amps, factory default of 1.25 Amps. This setpoint controls the current delivered to the stunner prods. This setpoint should be kept at or above 1.25 Amps. Increasing this setpoint will reduce involuntary kicking but also increase the likelihood of meat damage.

Setpoint #5 Step#2 Time Setting

Adjustable from 0.5 to 10.0 seconds, factory default of 1.2 seconds. This setpoint controls the length of time current is delivered to the stun prods. Longer stun times will help to keep involuntary kicking to a minimum.

Setpoint #6 Step#2 Frequency Control

Adjustable from 50 to 1000 Hz, factory default of 100 Hz. This setpoint controls the period of each current cycle. Increasing the frequency will reduce broken backs and blood splash but can increase involuntary kicking if the stun time is too short (<2.0 seconds). Consult factory before adjusting this parameter.

The Step#2 Current Setting, Time Setting and Frequency Control allows an operator to perform a two step stun; that is, a high frequency stun and a low frequency stun. In accordance with a preferred mode of operation, the high frequency stun is performed before the low frequency stun to reduce meat damage by bringing the animal into stun slowly.

Setpoint #7 Stun Lifted Prod Detect

Adjustable from 5% to 70% of stun time, factory default of 20%. This setpoint sets how much lifted prod is acceptable as a percent of stun time. It is recommended to start with a higher level (20%) and slowly decrease this level as operators become better trained.

Setpoint #8 Early Stun Delay

Adjustable from 0.5 to 1.0 seconds, factory default of 0.5 seconds. This setpoint controls how much time is allowed from when a stun command is requested to when prod contact is made.

Setpoint#9 No Stun Bus Voltage

Adjustable from 100 to 300 Volts, factory default of 200 Volts. This setpoint controls initial voltage applied to prods before contact detection is made. This level should be acceptable under all cases; consult factory before adjusting.

Setpoint #10 Timer #1 Setpoint

Currently this setpoint is not in use.

Setpoint #11 No Load Detect Level

Adjustable from 300 to 1500 Ohms, factory default of 700 Ohms. This setpoint controls when contact detection is made. A higher level may be required when stunning very large animals (boars and sows).

Setpoint #12 Stun Command Input

Momentary or Confirmation Contact. This setpoint controls what style stun command is expected by the stunner.

Momentary Contact: Operator presses and releases stun command button, unit stuns until timer expires.

Confirmation Contact: Operator must maintain stun command during the entire length of the stun. Unit will shutdown when either the timer expires or the operator removes the stun command.

Setpoint #13 Stunner Reference Address

This item sets the address sent to the Stun Performance Tracker software. Having each stunner set to a different address allows the tracking software to tell when stunners were changed over or moved.

Setpoint#14 Software Part Number

This item displays the part# and release date of the software. (You cannot change this parameter.)

By controlling the charge applied in accordance with the present invention improved stunning is achieved which results in reduced blood splash, improved meat quality, virtual elimination of broken backs and reduced maintenance. The present system further provides for the ability to track stunner preformation resulting long term improvement in operation by allowing for adjustments based upon prior results.

While the preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. A control system for applying an electrical charge in stunning an animal, comprising:

an electrical charge control section directly controlling electrical charge transmitted to stun paddles for stunning an animal;

a microprocessor controller linked to the electrical charge control section, the microprocessor controller being controlled via a manually operated user interface including a display and a plurality of input keys so as to generate a predetermined electrical waveform through the input of operating parameters relating to stun current, stun time and stun frequency, wherein the microprocessor controller generates instructions for controlling the waveform applied by the electrical charge control section by permitting adjustment of the stun current, stun frequency and stun time;

the system further including a current feedback linked between the stun paddles and the microprocessor controller for sensing improper operation of the system and a display providing a user with indications as to the improper system operation such that changes may be implemented through the use of the user interface.

2. The control system according to claim 1, wherein the microprocessor controller and electrical charge control section provide a high stun frequency with a constant peak current.

3. The control system according to claim 2, wherein the stun frequency is adjustable between approximately 50 and 1000 Hz.

4. The control system according to claim 3, wherein the stun frequency is approximately 400 Hz.

5. The control system according to claim 2, wherein the stun current is adjustable between approximately 0.75 and 3.00 A.

6. The control system according to claim 5, wherein the stun current is approximately 1.25 A.

7. The control system according to claim 2, wherein the stun time is adjustable between approximately 0.5 and 10.0 seconds.

8. The control system according to claim 7, wherein the stun time is approximately 1.0 second.

9. The control system according to claim 1, wherein the stun frequency is adjustable between approximately 50 and 1000 Hz.

10. The control system according to claim 9, wherein the stun frequency is approximately 400 Hz.

11. The control system according to claim 1, wherein the stun current is adjustable between approximately 0.75 and 3.00 A.

12. The control system according to claim 11, wherein the stun current is approximately 1.25 A.

13. The control system according to claim 1, wherein the stun time is adjustable between approximately 0.5 and 10.0 seconds.

14. The control system according to claim 13, wherein the stun time is approximately 1.0 second.

15. The control system according to claim 1, wherein the microprocessor controller further provides for adjustment of stun lifted prod detection.

16. The control system according to claim 1, wherein the microprocessor controller further provides for adjustment of early stun delay.

17. The control system according to claim 1, wherein the microprocessor controller further provides for adjustment of a no stun bus voltage.

18. The control system according to claim 1, wherein the microprocessor controller further provides for adjustment of a no load detection level.

19. The control system according to claim 1, wherein the microprocessor controller further provides for adjustment of a stun command input.

20. The control system according to claim 1, wherein the microprocessor controller further provides for adjustment of a stunner reference address.

21. The control system according to claim 1, wherein the predetermined electrical waveform is composed of a two step stun and the interface provides for the input of parameters relating to a first stun and a second stun.

22. The control system according to claim 21, wherein the interface provides for the input of stun current, stun time and stun frequency relating to the first stun and secondary stun current, stun time and stun frequency relating to the second stun.

* * * * *